United States Patent [19]

Skibinski

[11] Patent Number: 5,341,281

[45] Date of Patent: Aug. 23, 1994

[54] HARMONIC COMPENSATOR USING LOW LEAKAGE REACTANCE TRANSFORMER

[75] Inventor: Gary Skibinski, Milwaukee, Wis.

[73] Assignee: Allen-Bradley Company, Inc., Milwaukee, Wis.

[21] Appl. No.: 62,376

[22] Filed: May 14, 1993

[51] Int. Cl.$^5$ .............................................. H02M 1/12
[52] U.S. Cl. ..................... 363/39; 307/105; 336/211; 336/220
[58] Field of Search .............. 363/39, 40, 42, 45, 363/46; 307/105; 336/211, 212, 220, 232

[56] References Cited

U.S. PATENT DOCUMENTS

| | | |
|---|---|---|
| 3,531,652 | 9/1970 | Aemmer et al. |
| 3,628,057 | 12/1971 | Mueller |
| 4,651,265 | 3/1987 | Stacey et al. ............... 363/39 X |
| 4,833,585 | 5/1989 | Moran .......................... 363/39 |
| 5,032,738 | 7/1991 | Vithayathil |

Primary Examiner—Emanuel T. Voeltz
Attorney, Agent, or Firm—John J. Horn; H. Frederick Hamann; Andrew J. Nilles

[57] ABSTRACT

A harmonic compensator comprises a transformer having low leakage reactance connected between a utility and a load and a signal generator which injects into the transformer a signal having a frequency which cancels undesirable higher order harmonics induced by the load. The low leakage reactance nature of the transformer permits injection of high frequency signals which restore the fundamental sine wave of the signal from the utility and thereby eliminates undesirable non-linear harmonics which cause up-line disruptions. The low leakage reactance transformers may comprise a coaxial structure having a thin hollow tube as the primary coil, a coaxial structure having a single main coaxial cable distributed into several paralleled coaxial cables of smaller diameter, or a co-planar transformer structure having flat strip line conductors wrapped around a conventional core as the primary and secondary coils. Injection of a high frequency signal from the signal generator into the low leakage reactance transformer does not generate unacceptably large voltage drops as in conventional transformers because leakage reactance is low. Thus, the signal compensator is able to produce a signal of sufficiently high dynamic response to match that of even the fastest changing portions of the undesired harmonic signal travelling toward the utility from the load.

7 Claims, 8 Drawing Sheets

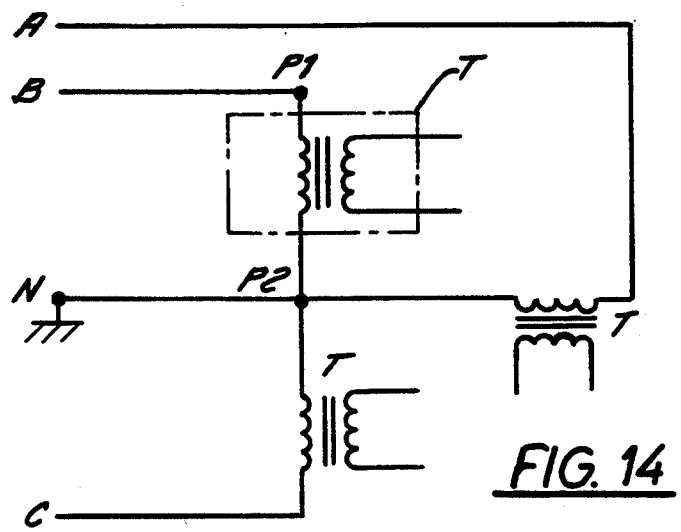
FIG. 14
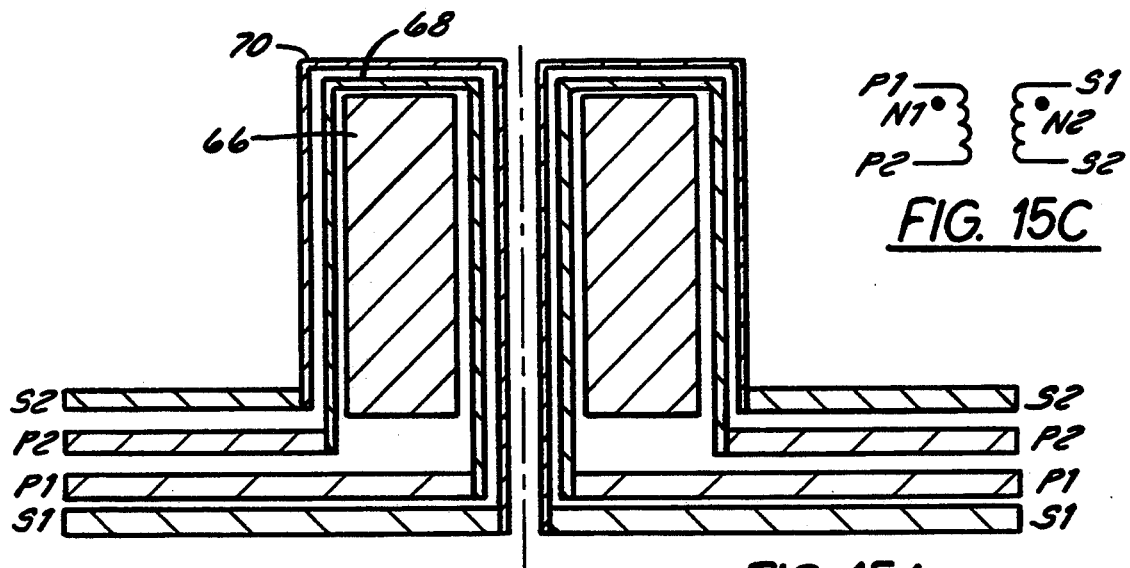
FIG. 15C
FIG. 15A
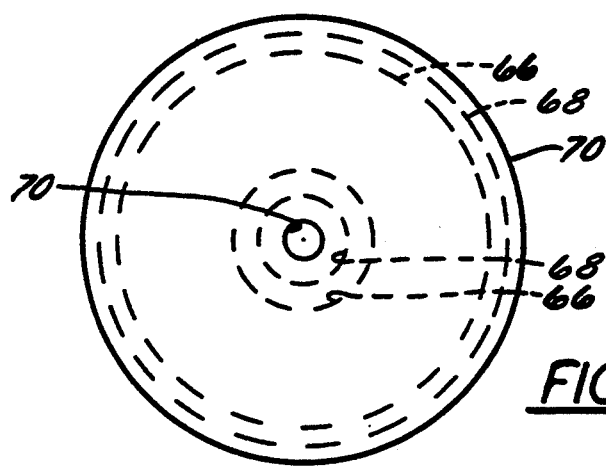
FIG. 15B

HARMONIC COMPENSATOR USING LOW LEAKAGE REACTANCE TRANSFORMER

BACKGROUND OF INVENTION

1. Field of Use

This invention relates generally to transformers. More specifically, this invention concerns transformers which have low leakage reactance.

2. Description of the Prior Art a. Conventional Transformer Structures

Leakage reactance, $L_l$, is present in all transformers and is caused by flux set up by the primary coil that does not link the secondary coil or vise versa. Primary or secondary winding leakage flux returns upon itself either through the core or by looping around in the gap between the primary and secondary coils. As a consequence, it is an important objective in transformer design to ensure that the primary coil is surrounded to the fullest extent possible by the secondary coil. Leakage reactance is detrimental for a number of reasons including that it decreases voltage regulation and decreases the dynamic response, especially for high frequency AC based systems.

Leakage reactance is a function of coil dimensions, winding-to-winding spacing, and the amount of primary to secondary coil area that is overlapped. Leakage reactance, $L_l$, is defined by Eq. 1, the parameters of which are illustrated in the conventional interleaved transformer construction of FIG. 1:

$$L_l = \frac{10.6 N^2 (MT)(2nc + a)}{10^9 n^2 b} \quad \text{Eq. 1}$$

where $L_l$ is the leakage inductance of both windings in Henry's; N is the number of turns; MT is the mean length of a turn in inches for a whole coil; n is the number of dielectrics between windings; c is the thickness in inches of dielectric between windings; a is the winding height in inches; and b is the winding width in inches. As is seen from Eq. 1, leakage reactance is reduced by using a small number of turns, short mean turn, and low, wide core windows. Eq. 1 assumes symmetrical coverage of primary-secondary windings. Leakage inductance may increase by a factor of 20 for a secondary coil layer that covers only 10% of the exposed primary coil area.

Leakage reactance is reduced by interleaving in conventional transformers. Leakage reactance in conventional transformers can be reduced but not eliminated because it is difficult to prevent leakage flux between the interleaved spaces c. Moreover, leakage reactance in conventional transformer structures is strongly coupled to the magnitude of the mutual or magnetizing inductance $L_m$ as seen in the transformer per phase equivalent circuit of FIG. 2 and Eq. 2. The parameter k is the primary-secondary coupling coefficient and is less than 1.0.

$$k \approx 1 - \frac{L_l}{2 L_m} \quad \text{Eq. 2}$$

Magnetizing inductance $L_m$ is the inductance needed to magnetize the core and, unlike leakage reactance, is desired to be as high as possible. Thus, $L_l$ and $L_m$ represent a design trade-off. As $L_m$ is increased by, for instance, increasing the number of turns, $L_l$ increases by the number of turns squared or $N^2$. A second trade-off exists between $L_e$ and $L_m$ in high voltage transformer applications. As the primary-secondary dielectric voltage stress is increased, the required dielectric insulation spacing between coils, c, also increases from Eq. 1. This tends to increase $L_l$ because the larger spacing between coils provides a larger leakage path between primary and secondary coils.

One unsatisfactory solution to the leakage reactance problem in transformers is the coaxial transformer, a portion of which is shown in FIG. 3. As is seen there, any leakage from the inner primary coil must pass through the secondary coil thereby ensuring that the leakage is linked through the secondary coil. The coaxial structure reduces $L_l$ because inductance is determined by the distance between the inner and outer coaxial coils and the internal self inductance of the conductors. The inductance for the 1:1 turns ratio coaxial structure of FIG. 4 is determined by Eq. 3.

$$L_l = \frac{\mu}{2\pi} \left\{ \frac{1}{4} + \ln \frac{R_2}{R_1} + \frac{1}{(R_3^2 - R_2^2)^2} \left[ R_3^4 \ln \frac{R_3}{R_2} - R_3^2(R_3^2 - R_2^2) + \frac{1}{4}(R_3^4 - R_2^4) \right] \right\} \text{henry/meter} \quad \text{Eq. 3}$$

The "¼" first term of Eq. 3 is due to the internal self inductance of a round cylindrical conductor. The second term, $\ln R_2/R_1$, represents leakage inductance resulting from the geometric spacing of the primary and secondary conductors. The third term may be considered an internal self inductance of the thin hollow tube secondary conductor. The third term is typically small in value because the $R_2$ and $R_3$ radius values are close in magnitude as can be seen from FIG. 4. The outer surface area of $R_3$ dissipates conductor heat and allows the equivalent $R_2$–$R_3$ conductor area to be reduced to a thin hollow tube.

Minimal leakage inductance occurs when the outer conductor is placed directly over the inner conductor and the intersticial space required for insulation, creapage, and clearance is minimized. This drives the $\ln(R_2/R_1)$ term towards zero. In the configuration in FIG. 4, the inner conductor internal self inductance "¼" term dominates the effective inductance regardless of the $R_1$ and $R_2$ radius values. For example, the arithmetic sum of the first and second term of Eq. 3 result in a 0.253992 value with $R_1 = 0.5$ inches and $R_2 = 0.502$ inches, while a sum of 0.250666 results with $R_1 = 3.0$ and $R_2 = 3.002$ inches, a total difference of 1%. Thus, the dominant internal self inductance "¼" term of Eq. 3 is essentially constant for solid cylindrical conductors. Skin and proximity effects of the $\ln(R_2/R_1)$ external inductance term and of the secondary hollow tube will have an immeasurable effect due to the dominant first term. Thus, conventional coaxial transformer structures have limited capacity to substantially reduce leakage reactance.

Furthermore, when the coaxial structure is designed to optimize the $L_m$ and $L_l$ trade-off, the transformer tends to be very long and requires many toroidal cores stacked together. As core length and the number of cores increases, the transformer becomes unwieldy and unattractive for most applications and manufacturing costs tend to rise dramatically.

b. Undesirable Load-Induced Harmonics

Referring again to FIG. 2 undesirable higher order harmonics such as the fifth, seventh, eleventh, thirteenth, fifteenth, seventeenth harmonics, and so on are caused by a number of different factors in a typical transformer application. Such nonlinear harmonics can be caused by the load itself, such as a solid state converter, or extraneous sources such as fluorescent lighting. These harmonics generate a harmonic current $I_H$, shown in FIG. 2, which are injected back toward the transformer and the utility from the load. If $I_H$ is large enough, devices attached up-line may experience problems due to these downline nonlinear harmonics.

FIG. 5A depicts a typical desired sine wave to be transmitted to the load from the utility. FIG. 5B depicts that same signal with undesirable harmonics in it. The problems of load-induced higher order harmonics has been brought into focus as of late as a result of new IEEE standards regarding harmonics. These standards are now better defined and likely to be enforced. Power users who generate substantial harmonics which are detrimental to up-line users, including the utility itself, will likely be liable for disruptions.

FIG. 6 depicts four different load current waveforms $I_{line}$ containing higher order harmonics that are commonly induced by loads such as solid-state converters. As is seen, FIG. 6A is a six pulse converter with DC link L-C filter under light load conditions, FIG. 6B is a six pulse converter with DC link L-C filter under lull load conditions, FIG. 6C is a twelve pulse converter with large DC link inductor, and FIG. 6D is a six pulse converter with large DC link inductor. As is seen, some of the currents generated are discontinuous and may have high peaks compared to RMS values. It is desirable to cancel out the higher order harmonics to recapture the fundamental component of the current so that up-line disruptions are eliminated.

In a typical transformer application, higher order harmonics as high as the seventeenth harmonic should be suppressed. Beyond the seventeenth harmonic, inductance at the utility presents a sufficiently high impedance which masks the effect of the undesirable harmonics. Assuming that harmonics up to the seventeenth harmonic should be suppressed, it can be seen from Eq. 4 that the minimum frequency, $f_{min}$, that is required to cancel out the highest order harmonic number and return the signal to its fundamental order (e.g., fundamental = 60 Hz) is:

$$f_{min} = f_{fundamental} \cdot n_{harmonic} \cdot n_{encoder} \quad \text{Eq. 4}$$

The encoding number from Eq. 4 acknowledges that in order to use a pulse width modulation system (PWM), in the compensator, one must use an encoding frequency that is twelve times greater than the frequency of the highest harmonic. The actual switching frequency of the device in the compensator is at the $f_{min}$ frequency.

Thus, substituting 17 for $n_{harmonic}$ in Eq. 4 it can be seen that a 12 kHz signal must be injected into the transformer primary to compensate for the seventeenth harmonic. Injection of such a high frequency, high current component into a conventional transformer, however, will create a large voltage drop across inductance $L_l$ in FIG. 2 according to Eq. 5:

$$V_l = I_{line} \cdot X_l \quad \text{Eq. 5}$$

Where $V_l$ is the voltage drop across $L_l$, $L_{line}$ is the injected current, and $X_l$ is the leakage reactance of the transformer. Eq. 5 can be rewritten as follows:

$$V_l = I_{line} 2\pi f_{min} L_l \quad \text{Eq. 6}$$

As the voltage across inductance $L_l$ increases, voltage stress increases which increases the necessary volt-ampere rating and required size of the components. This is undesirable for obvious reasons.

The second problem encountered when attempting to inject a signal of such high frequency and high current into a conventional transformer having significant leakage reactance is illustrated by Eq. 7:

$$L_l(\text{max}) = \frac{V_{comp} - V_{load}}{di/dt} \quad \text{Eq. 7}$$

where $V_{comp}$ is the voltage in the compensating device, $V_{load}$ is the voltage at the load, and $di/dt$ is the rate of change of current. It can be seen from Eq. 7 that if leakage reactance is high, $di/dt$ is too low, thus making it very difficult if not impossible to compensate for the higher order harmonics in the signal; the dynamic response of the signal injector cannot be made high enough to follow the rapidly changing rate of current.

Further complicating matters is that as the minimum compensating frequency $f_{min}$ is increased, $X_l$ increases which requires higher voltage compensation and greater dynamic response. The dynamic response of any compensator in the system is limited because of the fixed volt-ampere (VA) size of the compensator.

Referring again to Eq. 2 illustrating the close coupling between $L_l$ and $L_m$, it can be seen that if k=0.9995, which is the best known k available for conventional transformers, and $L_m$ is chosen to meet a predetermined VA size of the compensator, the $L_l$ solved for typically would be much too high to allow sufficient compensation for undesirable harmonics.

SUMMARY OF THE INVENTION

A transformer having low leakage reactance is presented. Specifically, a transformer having a novel coaxial structure using a thin hollow tube as the primary coil is disclosed. Leakage reactance is reduced thereby because the constant internal flux linkage term of the governing $L_l$ equation is replaced by a term that is a function of inner and outer radii of the tube. Consequently, the coaxial transformer of the present invention yields far greater design flexibility and reduction of leakage reactance than prior conventional transformers and coaxial transformers with solid primary conductors.

Also disclosed is a coaxial transformer having a single main coaxial cable distributed into several coaxial cables, each of smaller diameter, but while retaining the total conductor area equal to the main cable. For example, three small coaxial cables, which are connected in parallel and current balanced and do not interact because of their coaxial nature, reduce leakage reactance, $L_l$, by a factor of 3 over that of a single main coaxial cable. This significant reduction in leakage reactance is furthermore achieved without an increase in the size of the coaxial transformer.

Also disclosed is a co-planar transformer using flat strip line conductors wrapped around a conventional core for the primary and secondary coils. The conventional core types may include standard core, shell, and pot. The co-planar transformer also achieves significant reduction in leakage reactance while avoiding the more costly torroidal cores necessary for coaxial transformers.

Also disclosed is a novel structure and method for compensating for undesired higher order harmonics by utilizing one of the disclosed low leakage reactance transformers and injecting into the transformer a compensating current $I_{comp}$ which cancels higher order harmonics and restores the fundamental sine wave desired to be received by the load without increasing voltage stress. Nonlinear harmonics which may cause significant disruption to up-line devices are eliminated.

BRIEF DESCRIPTION OF THE DRAWINGS

FIG. 14 depicts a standard three-phase WYE transformer connection utilizing three single-phase transformers;

FIGS. 15A and B are schematics of a side view and a top view of a high-frequency high-power low leakage reactance tubular transformer of the present invention respectively. and FIG. 15C is the equivalent circuit representing this transformer;

DESCRIPTION OF THE PREFERRED EMBODIMENTS a. Coaxial Tubular Transformer

Figure 7:
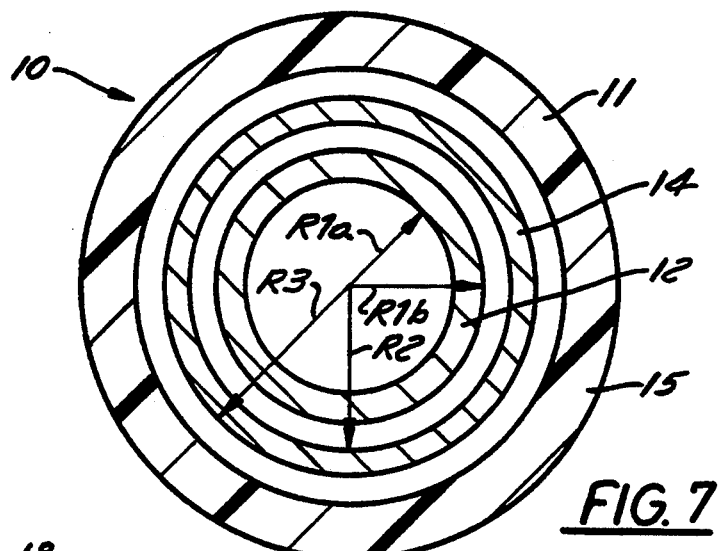
FIG. 7 depicts a coaxial transformer of the present invention having tubular primary and secondary conductors.

Referring to FIG. 7, an improved coaxial transformer 10 having a thin tube as the inner conductor is depicted. The coaxial transformer 10 comprises an inner conductor 12 comprising a thin tube of conductive material, typically copper, and an outer conductor 14 comprising a thin tube of similar conducting material and a magnetic core 11 through which conductors 12 and 14 pass. The thickness of the tubes 12 and 14 is dictated by the frequency of operation, allowable skin effect resistance, and the thermal heat dissipation capability at the given current rating determined accordingly. Dielectric 16, such as kapton or teflon, separates inner and outer conductors. Dielectric 15 insulates the outer conductor from the core. As can be seen, the inner diameter of the inner conductor 12 is R1a and its outer diameter is R1b. The inner diameter of the outer conductor 14 is R2 and its outer diameter is R3. As discussed above, leakage reactance for the coaxial tubular transformer is defined by Eq. 8.

$$L_l = \frac{\mu}{2\pi}\left\{\frac{1}{(R_{1b}^2 - R_{1a}^2)^2}\left[R_{1b}^4 \ln\frac{R_{1b}}{R_{1a}} - R_{1b}^2(R_{1b}^2 - R_{1a}^2) + \frac{1}{4}(R_{1b}^4 - R_{1a}^4)\right] + \ln\frac{R_2}{R_{1b}}\right\} + \frac{\mu}{2\pi}\left\{\frac{1}{(R_3^2 - R_2^2)^2}\left[R_2^4 \ln\frac{R_3}{R_2} - R_2^2(R_3^2 - R_2^2) + \frac{1}{4}(R_3^4 - R_2^4)\right]\right\} \text{henry/meter.} \quad \text{Eq. 8}$$

By replacing the solid cylindrical inner conductor of a conventional coaxial transformer with a thin hollow tube, the constant internal flux linkage "¼" first term of Eq. 3 is replaced by a term similar to that of a hollow tube, of significantly lower magnitude, that is a function of inner and outer radii. In so doing however, it is necessary to increase the diameter of the inner conductor 12 by roughly two times so that it contains roughly the same amount of conductive material found in a conventional solid inner conductor. The minimum copper area of FIG. 7 is determined by the allowed copper temperature rise above ambient and the maximum insulation temperature rating which determines the cable life span. This is solved for conventionally.

Table 1 is an inductance comparison of the conventional solid conductor coaxial transformer configuration and the novel thin hollow tube coaxial transformer configuration of the present invention.

TABLE 1

Figure 4:
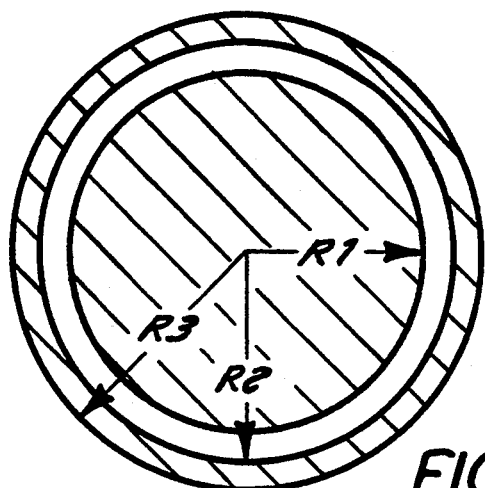
FIG. 4 is a schematic cross section of a conventional coaxial conductor cable used in a transformer.
Figure 5A:
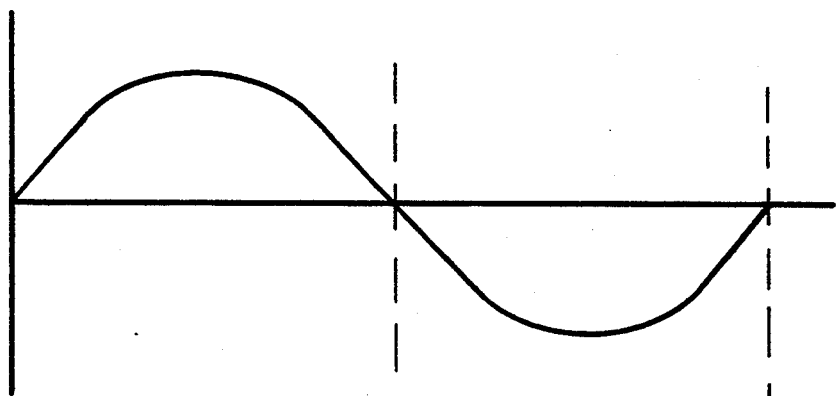
FIGS. 5A and B depict a fundamental frequency sine wave and a fundamental frequency sine wave having higher order harmonics present therein, respectively.
Figure 5B:
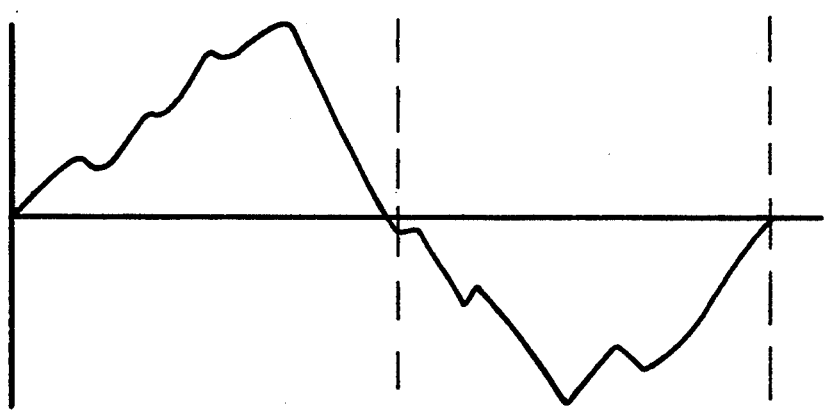
Figure 6A:
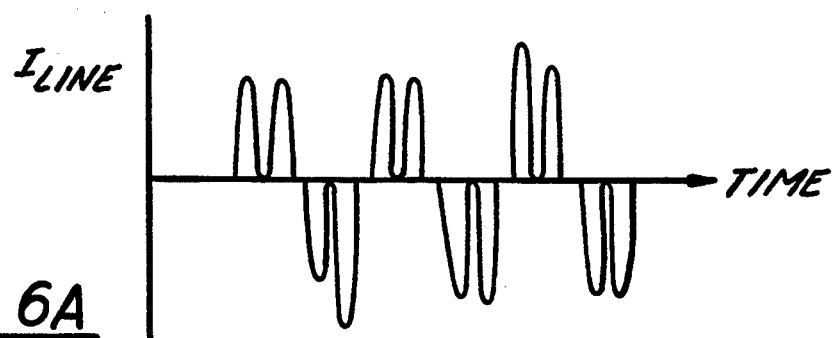
FIGS. 6A–D depict $I_{line}$ commonly found in typical transformer applications containing undesirable higher order harmonics from the load.
Figure 6B:
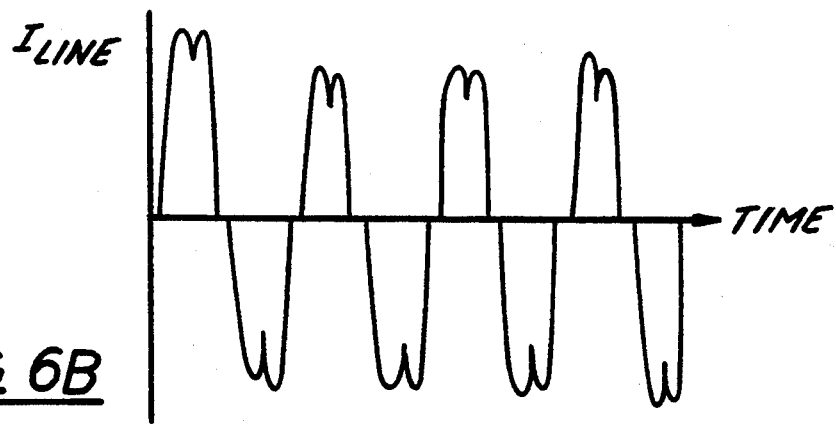
Figure 6C:
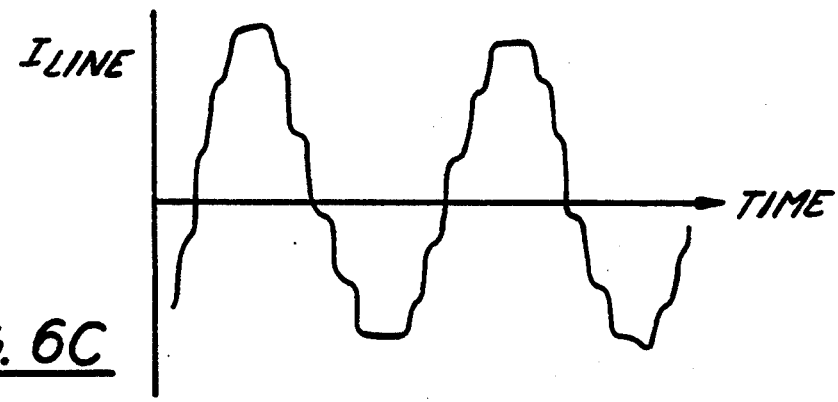
Figure 6D:
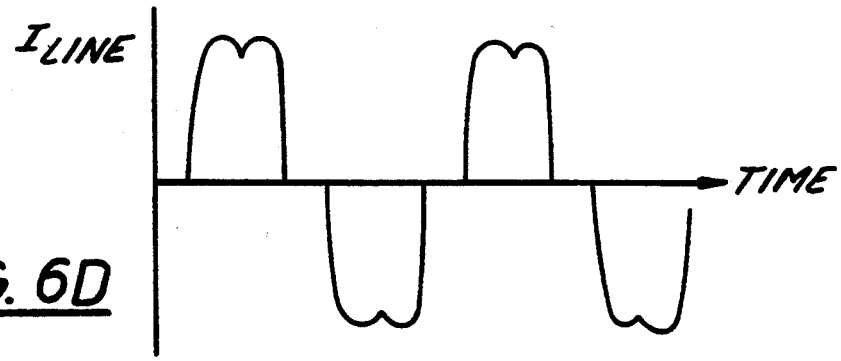

| Configuration | Solid Inner Conductor FIG. 4 | Hollow Inner Conductor FIG. 7 |
|---|---|---|
| Inner conductor radius [in] | | |

TABLE 1-continued

| Configuration | Solid Inner Conductor FIG. 4 | Hollow Inner Conductor FIG. 7 |
|---|---|---|
| $R_1$ | 0.230 | — |
| $R_{1a}$ | — | 0.468 |
| $R_{1b}$ | — | 0.496 |
| Outer conductor radius [in] | | |
| R2 | 0.232 | 0.498 |
| R3 | 0.237 | 0.500 |
| Outer diameter ratio* {FIG. 7/FIG. 4} | | 2.1 |
| Inner conductor internal inductance** | 0.250000 (91%) | 0.019000 (80%) |
| Leakage inductance term** | 0.008658 (3%) | 0.004032 (17%) |
| Outer conductor internal inductance** | 0.015165 (6%) | 0.001008 (3%) |
| Total inductance** | 0.273823 (100%) | 0.024039 (100%) |
| Inductance ratio {FIG. 4/FIG. 7} | | 11.4 |

*Configuration dimensions based on equal conductor temperature rise.
**Multiply all inductance volume by $\mu 2\pi$ to obtain inductance in henry/meter.

It can be seen from Table 1 that the inner conductor internal inductance accounts for 91% of the inductance in the conventional solid conductor coaxial transformer and thus that by reducing the inner conductor internal inductance, inductance is substantially reduced. The advantage of using thin tubular conductors as in FIG. 7 is an order of magnitude reduction of the inner conductor internal self inductance term in Table 1. The overall inductance is likewise reduced because this term is the dominant inductance term.

The trade off of using the transformer of the present invention depicted in FIG. 7 is that the overall wire conductor cable radius is increased by a factor of two to maintain an equivalent amount of copper compared to a solid inner conductor due to thermal considerations conventionally determined. The core window area, $A_{window}$, required is thus roughly four times greater than in the case of the solid inner conductor coaxial configuration. This results in a size and cost disadvantage because core size is selected based on the core window-core area, or $A_{window} A_{core}$ product. Furthermore, the mechanics of bending hollow tubes at the end turns is a difficult process, especially when five or more turns through a core window are required. The leakage reactance at the end turns may also increase significantly depending on how the multi-turn interconnection at the end turns is accomplished. Nonetheless, where an order of magnitude smaller leakage inductance is essential, and increased size and manufacturing cost are tolerable, the thin hollow tube primary coaxial cable transformer configuration of the present invention is quite desirable.

b. Distributed Coaxial Transformer

Figure 8A:
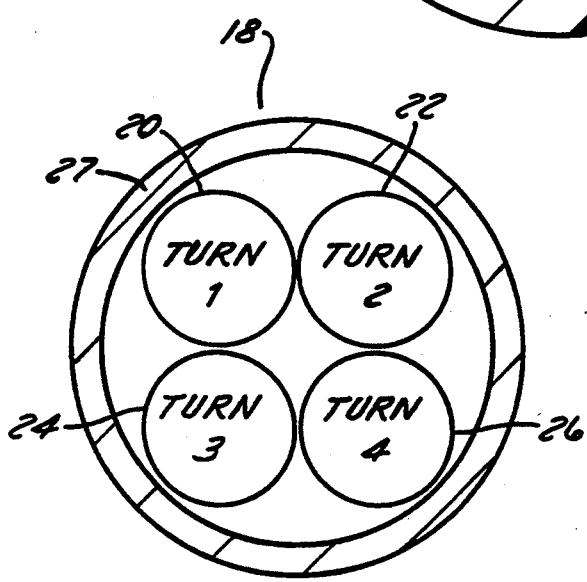
FIGS. 8A and B depict a coaxial transformer of the present invention having the main coaxial cable (FIG. 8A) distributed into several smaller coaxial cables in parallel (Fig. B)
Figure 8B:
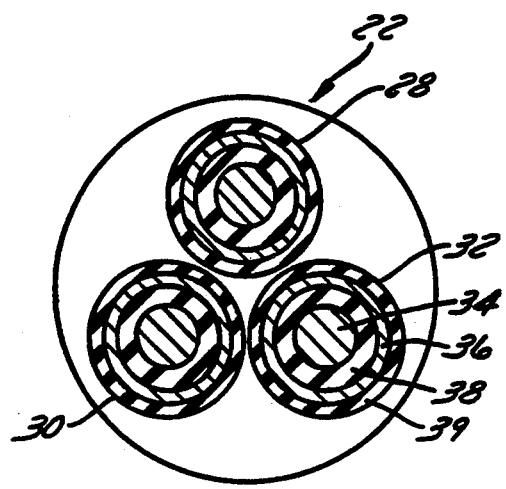

Referring to FIGS. 8A and B, a coaxial transformer of the present invention having a distributed main coaxial cable is depicted. FIG. 8A shows a coaxial transformer 18 having four turns 20, 22, 24, and 26 in a toroidal core 27. Each turn may comprise three coaxial cables 28, 30, and 32 coupled in parallel as depicted in FIG. 8B, or any number desired. The sum conductor cross section area of the parallel coaxial cable combination is preferably at least equal to that of the original single main coaxial cable. Each of coaxial cables 28, 30, and 32 comprises a primary conductor 34, preferably litz wire, for high frequency useage, a secondary conductor 36, preferably braided wire, separated by conventional dielectric 38, and insulation 39.

The distributed coaxial cables 30, 32, and 34 are connected in parallel and preferably have balanced currents. The several parallel coaxial cables cause a division of the internal self-inductance term, "$\frac{1}{4} \mu/2\pi$" term of Eq. 3, of the original main coaxial cylindrical solid conductor by the number of parallel sections $N_p$, in this case three. Thus, where the distribution is into two cables, the inductance of the original single main coaxial cable is divided by 2. If four smaller cables are used, inductance is divided by 4, and so on.

Figure 9:
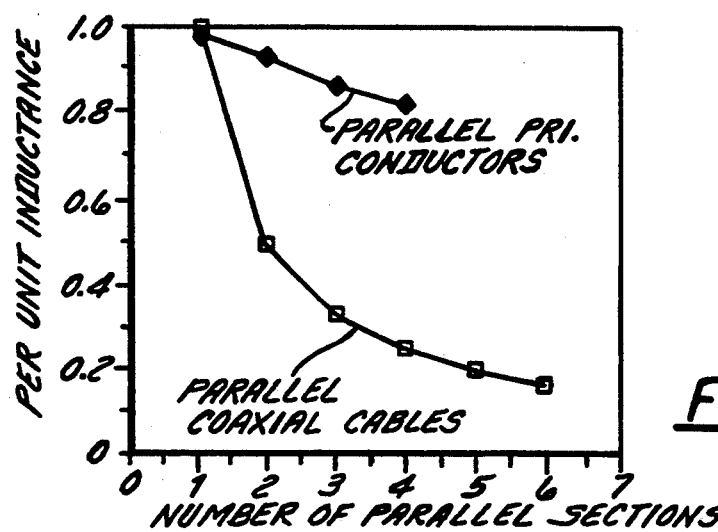
FIG. 9 is a graph showing the inductance reduction for both parallel wire and parallel coaxial cables.

This advantage, however, is lost if paralled conductors rather than paralleled coaxial cables are used where mutual inductance between the parallel conductors becomes dominant and is additive to the self inductance of each individual wire because the currents through the wires are in the same direction. Referring to FIG. 9, simply paralleling uninsulated wires does little to reduce the effective inductance of the mutual coupling effect between wires. Thus, according to the present invention, the preferred way to achieve the divide by $N_p$ reduction in $L_l$ for $N_p$ parallel circuits is to prevent mutual coupling of the circuits. This could be achieved by spreading the circuits sufficiently far apart, however, this is usually not practical. As depicted in FIG. 8B, on the other hand, parallel coaxial circuits with balanced primary and secondary currents so that the net external field outside each coaxial cable is zero, thus preventing any mutual coupling from taking place, is preferred. Using Eq. 3 it can be seen that the $L_l$ of each individual smaller coaxial cable is within roughly 5% of the initial main coaxial cable (prior to distribution) as long as the secondary is placed directly over the primary.

It is seen in FIG. 9 that the largest reduction in leakage reactance $L_l$ occurs by paralleling no more than four coaxial circuits, i.e., by separating the main coaxial cable into no more than four coaxial cables. Thus, significant reductions in $L_l$ can be achieved in a novel coaxial configuration that does not require increasing the diameter of the primary conductor to unacceptable levels. The original configuration and $A_{window} A_{core}$ sizing of the core interior can be maintained and $L_l$ decreased by distributing the main coaxial cable into two or more smaller coaxial cables that are in parallel and have current balanced primary and secondary cables, and do not interact because of their coaxial configuration.

c. Coplanar Strip Line Transformer

Figure 10A:
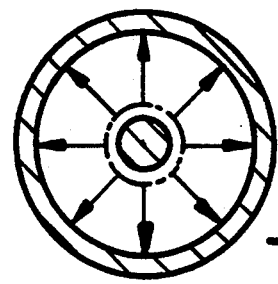
FIGS. 10A–D show coaxial distribution with total field containment, a coupled bus bar with leakage fields, a fiat strip line with leakage fields at ends only, and a modified strip line with total field containment, respectively.
Figure 10B:
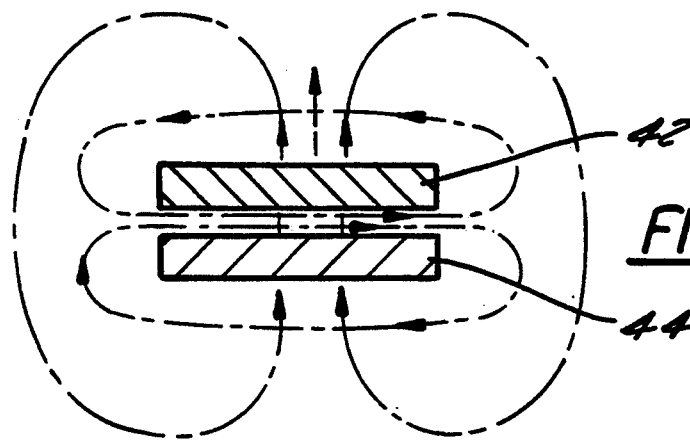
Figure 10C:
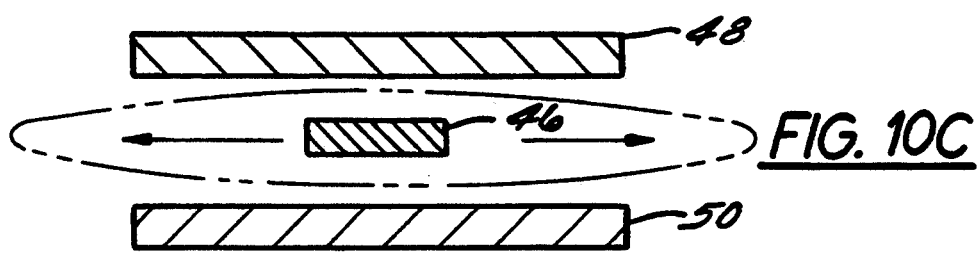
Figure 10D:
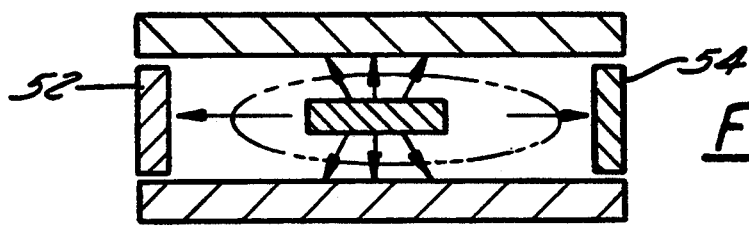

Referring now to FIGS. 10A–D, evolution of a coaxial transformer winding to a strip line transformer winding is shown. In these figures the solid arrows are electric field lines and the dashed lines are magnetic field lines. FIG. 10A depicts a conventional coaxial distribution with total field containment. The inner primary conductor is surrounded in all places by the outer secondary conductor. As seen in FIG. 10B, a coupled conductor comprising a flat strip primary conductor 42 and a flat strip secondary conductor 44 generate significant leakage fields. Referring to FIG. 10C, a narrow flat strip primary conductor 46 is sandwiched between two wide secondary flat strip conductors 48 and 50 that are connected in parallel. This configuration has a reduced leakage field compared to that in FIG. 10B. The leakage in the structure of 10C can be reduced further by reducing the gap between the primary conductor 46 and each of the secondary conductors 48 and 50. In FIG. 10D, the structure of FIG. 10C is modified with end coils 52 and 54 which are connected in parallel with the secondary plates or coils 48 and 50 to fully contain the fields so that virtually no leakage occurs. The strip line transformer configurations of the present invention depicted in FIGS. 10C and 10D in some sense resemble the field containment provided by a coaxial transformer but have the advantage that they are much more easily and inexpensively manufactured because of their flat plate configuration. The coplanar structure of FIG. 10D may be considered the dual of the coaxial structure of FIG. 10A.

Figure 11A:
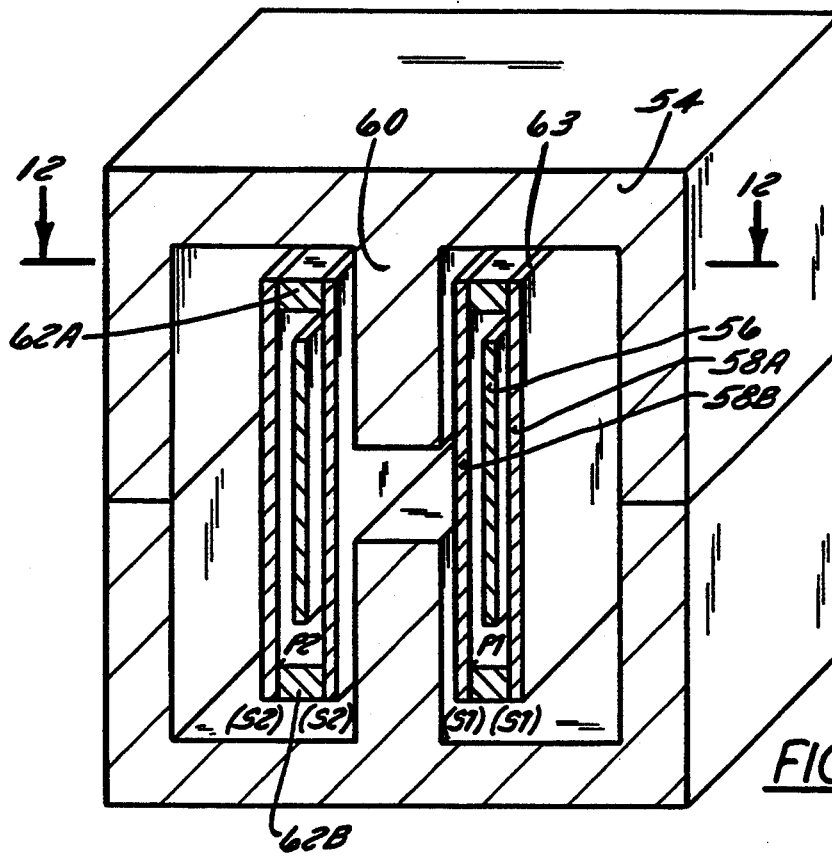
FIG. 11A depicts a coplanar stripline construction transformer of the present invention comprised of integrated strip line conductors for low leakage inductance.
Figure 11B:
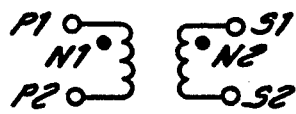
FIG. 11B depicts the equivalent circuit of this transformer and a 1:1 primary-secondary turns ratio.
Figure 12:
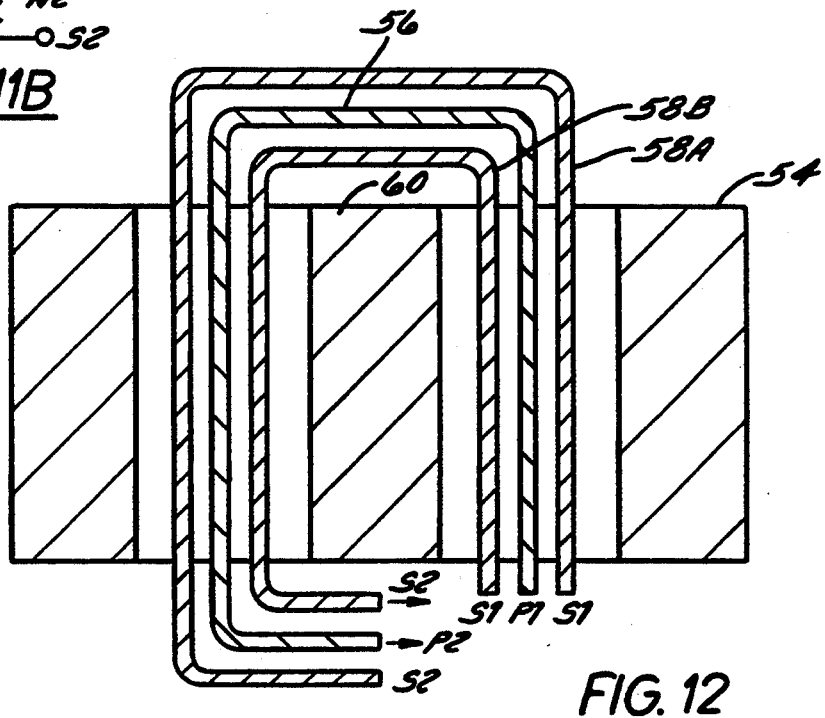
FIG. 12 depicts a schematic three-dimensional top view of the transformer of FIG. 11.
Figure 13:
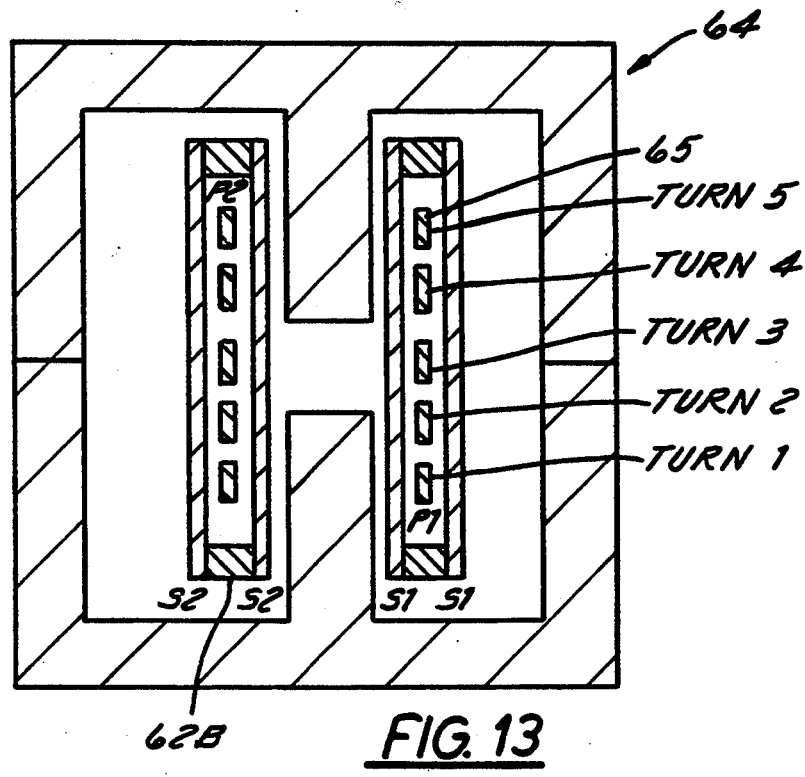
FIG. 13 depicts a co-planar strip line transformer of the present invention comprising integrated strip line conductors for low leakage inductance and a 5:1 primary-secondary turns ratio.

Referring to FIGS. 11 and 12, a coplanar transformer assembly using strip line conductors for low leakage is depicted. A single phase transformer version of the present invention depicted in FIGS. 11 and 12 comprises a standard non-torroidal core 54, in this case two standard E—E cores glued together in a shell type core configuration, and primary coil flat plate 56 and parallel secondary coil flat plates 58A and B wound around the inner core portion 60 of core 54. Gaps may be made in the core 54 where needed to vary magnetic inductance ($L_m$). The primary flat plate 56 of the single phase coplanar strip line may be connected at one end to a utility and at its other end to earth neutral in, for example, a conventional three-phase WYE configuration as shown in FIG. 13 discussed below. The secondary conductor flat plate coils 58A and B surround the primary flat plate coil 56 at nearly all points thereby ensuring that flux leakage links to the secondary flat plate coils 58A and B. The secondary flat plate coils 58A and B are connected in parallel. FIG. 11B depicts the equivalent circuit of the coplanar transformer of FIGS. 11 and 12.

FIG. 14 depicts a standard 3-phase WYE configuration having lines A, B, and C representing the three phases from a utility and line N representing earth neutral. Conventionally, each phase has its own single phase transformer T which may comprise the transformer of the present invention including that depicted in FIGS. 12 and 13.

Figure 1:
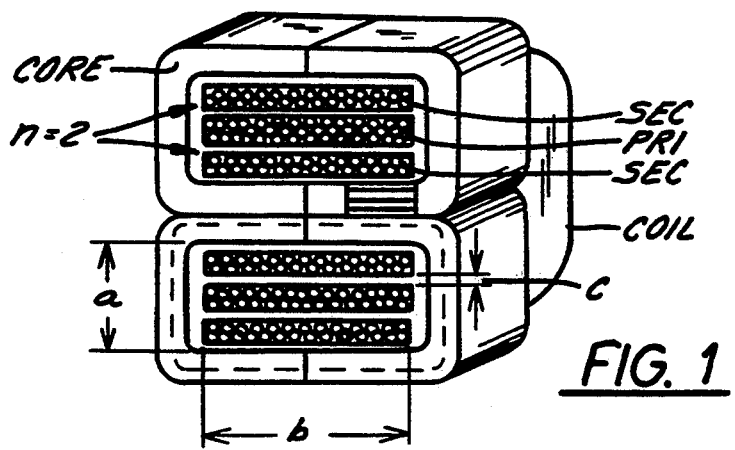
FIG. 1 is a perspective view of a conventional interleaved transformer construction.

In order to completely enclose leakage flux in the transformer of the present invention depicted in FIGS. 11 and 12, optional end plates 62A and B, shown only in FIG. 11, may be inserted between the secondary flat plate coils 58A and B to prevent leakage from the primary flat plate coil 56 beyond the edges 63 of the secondary flat plate coils 58A and B. The primary secondary turns ratio ($N_1/N_2$) is depicted in FIG. 1 for a 1:1 turns ratio configuration. This may be extended to any $N_1/N_2$ desired. FIG. 13 depicts a 5:1 turns ratio transformer 64 that also retains the low leakage capacitance of the co-planar configuration, however, the primary coil flat plate has been replaced by a five turn primary flat plate 65 in FIG. 13.

d. High Frequency Low Reactance Tubular Transformer

Referring now to FIGS. 15A and B, a high frequency high power tubular transformer assembly for a 1:1 turns ratio $N_1/N_2$ is presented comprising a torroid core 66 surrounded by a concentric inner tube 68 running up and over the core 66. Tube 68 is considered the primary winding. The assembly also comprises a concentric outer secondary tube 70 running up and over the primary tube 68. This configuration provides total field containment. Inner or primary tube 68 is connected between the P1 and the P2 terminations. Outer tube 70 is connected between the S2 and S1 terminations with the dot polarity shown in FIG. 15C.

The magnetic field outside the outer tube 70 is zero according to Ampere's law for DC or AC current imposed on the inner tube 68. The voltage induced across the magnetizing inductance $L_m$ of the transformer is mostly developed across the inner tube 68. The outer tube 70 potential is thus fairly close to the termination potential and acts as a low impedance shield. The electric field is emitted radially from the inner tube 68 and is attenuated by the core 66 and the conductivity of the outer tube 70 wall thickness. Conventional shielding formulas may be used to determine attenuation.

The tubes 68 and 70 have a large RMS current capability because of the large surface area exposed to the air. The inner tube and outer tubes 68 and 70 may preferably have small diameter holes punched around the cylinder to allow a free flow of air into the inner tube and inner core diameter. The sum of the inlet area holes and the exit area holes at the inner tube may preferably be equal to induce an air draft.

The 1:1 turns ratio may be extended to multiturn applications requiring larger $L_m$ magnitudes by concentrically feeding additional primary-secondary coupled tubes running up and over the core 66.

e. Signal Injection to Cancel Undesirable Harmonics

Figure 2:
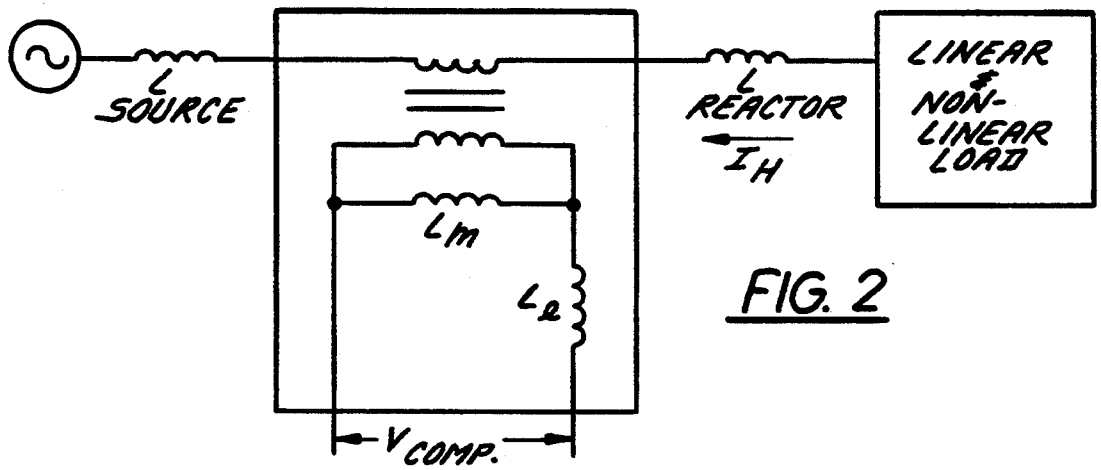
FIG. 2 depicts a transformer per phase equivalent circuit showing magnetizing inductance $L_m$ and leakage reactance $L_l$.
Figure 3:
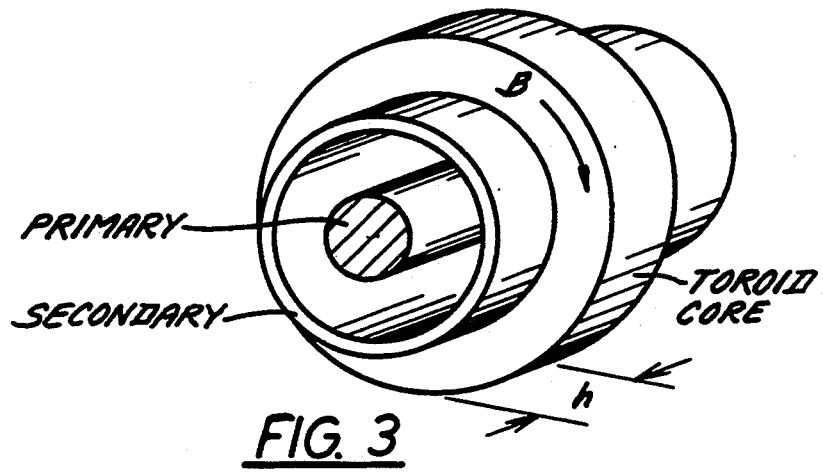
FIG. 3 is a perspective view of a conventional coaxial transformer construction.
Figure 16:
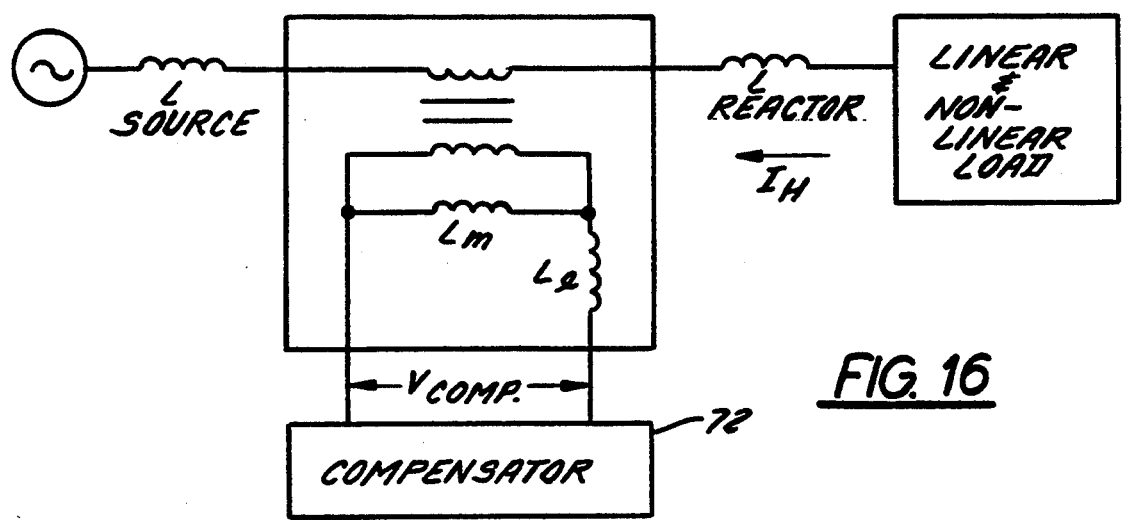
FIG. 16 depicts the per phase equivalent circuit of FIG. 2 having a harmonic compensator attached across transformer inductance $L_m$.

Referring now to FIG. 16, a per phase equivalent circuit is shown, as was shown in FIG. 2, but with the addition of a signal generator or compensator 72 connected across the $L_m$ inductance. The signal generator 72 is conventional and provides a signal having a frequency, for a pulse width modulation system, equal to the product of twelve times the highest number harmonic to be compensated and the operating frequency of the system. For example, where the highest order harmonic induced by the load is the seventeenth harmonic, the signal generator would inject into the transformer a signal having a frequency of at least 12 kHz. The effect of the injection of the 12 kHz signal is to restore the fundamental sine wave of the signal from the utility. Undesirable nonlinear harmonics will be canceled out thus relieving up-line devices of disruptions.

Injecting a signal of such a relatively high frequency into a conventional transformer having high leakage reactance generates an unacceptably large voltage drop across the $L_l$ inductance in accordance with Eq. 6 from above:

$$V_1 = I_{line} 2\pi f_{min} L_l.$$

The low leakage reactance transformers of the present invention minimize voltage stress and the otherwise necessary increase in kilovoltamperes (KVA) ratings caused by the large voltage drop across $L_l$ in a conventional transformer. Furthermore, the transformers of the present invention, having low $L_l$, enable the signal from the signal generator 72 to smooth out the undesirable harmonics in the signal traveling toward the utility from the load as seen in Eq. 7 from above:

$$L_l(\max) = \frac{V_{comp} - V_{load}}{di/dt}$$

Thus, the standard signal generator 72 is able to produce a signal of sufficiently high dynamic response to match that of even the fastest changing portions (di/dt) of the harmonic signal traveling toward the utility from the load.

Consequently, the low leakage reactance transformers of the present invention enable construction of designs for numerous low frequency low leakage reactance designs as well as high frequency low reactance transformer applications. The invention also enables a harmonic cancellation system which eliminates undesirable nonlinear harmonics and the disruptions caused to up-line devices.

It is to be understood that embodiments of the present invention not disclosed herein are fully intended to be within the scope of the claims.

I claim:

1. A device for compensating for undesirable higher order harmonics induced by a load, said device comprising:

transformer means having low leakage reactance connected between a utility and said load on a line having a line frequency;

a compensator connected to said transformer means, said compensator comprising a signal generator which injects into said transformer means a signal having a frequency which cancels said undesirable higher order harmonics induced by said load.

2. The invention as defined in claim 1 wherein said signal injected into said transformer means has a frequency approximately twelve times greater than the product of the line frequency and the frequency of the highest undesirable harmonic.

3. The invention as defined in claim 2 wherein said signal injected into said transformer means corresponds to a frequency association with at least the thirteenth harmonic.

4. The invention as defined in claim 1 wherein said transformer means comprises a core, a first tube passing through said core and having a longitudinal axis, a second tube passing through said core, said second tube having a longitudinal axis and positioned around and spaced from said first tube, and said longitudinal axes being aligned with one another.

5. The invention as defined in claim 1 wherein said transformer means comprises a core and a plurality of parallel coaxial cables passing through said core, the inner conductor of each of said coaxial cables comprising a primary conductor and the outer conductor of each of said coaxial cables comprising a secondary conductor.

6. The invention as defined in claim 1 wherein said transformer means comprises a core, a first flat plate having two sides and wound around said core in a winding direction, and second and third plates wound around said core and on either side of said first plate in said winding direction.

7. The invention as defined in claim 6 wherein said plates have a dimension in a direction perpendicular to said winding direction and said dimension of said first plate in said direction perpendicular to said winding direction is less than said dimension of said second and third plates in said direction perpendicular to said winding direction.

* * * * *